United States Patent
Van Gaasbeck

(10) Patent No.: US 10,289,550 B1
(45) Date of Patent: May 14, 2019

(54) METHOD AND SYSTEM FOR DYNAMIC WRITE-BACK CACHE SIZING IN SOLID STATE MEMORY STORAGE

(71) Applicant: EMC IP Holding Company LLC, Hopkinton, MA (US)

(72) Inventor: Richard H. Van Gaasbeck, Mountain View, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 221 days.

(21) Appl. No.: 15/394,944

(22) Filed: Dec. 30, 2016

(51) Int. Cl.
*G06F 12/0868* (2016.01)
*G06F 12/0871* (2016.01)
*G06F 12/0804* (2016.01)

(52) U.S. Cl.
CPC ...... *G06F 12/0804* (2013.01); *G06F 12/0868* (2013.01); *G06F 12/0871* (2013.01); *G06F 2212/621* (2013.01)

(58) Field of Classification Search
CPC ............. G06F 12/0804; G06F 12/0868; G06F 12/0871
See application file for complete search history.

(56) References Cited

U.S. PATENT DOCUMENTS

| | | | |
|---|---|---|---|
| 6,016,275 A | 1/2000 | Han | |
| 6,862,675 B1 | 3/2005 | Wakimoto | |
| 7,559,004 B1 | 7/2009 | Chang et al. | |
| 8,189,379 B2 | 5/2012 | Camp et al. | |

(Continued)

FOREIGN PATENT DOCUMENTS

| | | |
|---|---|---|
| CN | 102150140 A | 8/2011 |
| CN | 103902234 A | 7/2014 |

(Continued)

OTHER PUBLICATIONS

Chen, Feng, Rubao Lee, and Xiaodong Zhang. "Essential roles of exploiting internal parallelism of flash memory based solid state drives in high-speed data processing." High Performance Computer Architecture (HPCA), 2011 IEEE 17th International Symposium on. IEEE, 2011. (Year: 2011).*

(Continued)

*Primary Examiner* — Charles Rones
*Assistant Examiner* — Hewy H Li
(74) *Attorney, Agent, or Firm* — Chamberlain, Hrdlicka, White, Williams, & Aughtry

(57) ABSTRACT

A method for dynamic write-back cache sizing in solid state memory storage. The method includes receiving a request to write a data fragment to a memory location of a storage medium, identifying a resource required for the writing, and obtaining a state of the resource. The state of the resource is governed by a number of data fragments that are stored in the write-back cache which require the resource. The number of data fragments in the write-back cache which require the resource are limited to enable writing of all data fragments in the write-back cache to the storage medium, within a specified amount of time. The method further includes determining that the state of the resource allows the received data fragment to be stored in the write-back cache, and based on the determination: storing the data fragment in the write-back cache and acknowledging the write request.

20 Claims, 5 Drawing Sheets

(56) References Cited

U.S. PATENT DOCUMENTS

| | | | |
|---|---|---|---|
| 8,259,506 B1 | 9/2012 | Sommer et al. | |
| 8,305,812 B2 | 11/2012 | Levy et al. | |
| 8,335,893 B2 | 12/2012 | Tagawa | |
| 8,694,724 B1* | 4/2014 | Linnell ............... | G06F 11/2082 |
| | | | 711/113 |
| 8,819,503 B2 | 8/2014 | Melik-Martirosian | |
| 8,868,842 B2 | 10/2014 | Yano et al. | |
| 8,891,303 B1 | 11/2014 | Higgins et al. | |
| 8,934,284 B2 | 1/2015 | Patapoutian et al. | |
| 8,995,197 B1 | 3/2015 | Steiner et al. | |
| 9,026,764 B2 | 5/2015 | Hashimoto | |
| 9,195,586 B2 | 11/2015 | Cometti et al. | |
| 9,330,767 B1 | 5/2016 | Steiner et al. | |
| 9,368,225 B1 | 6/2016 | Pinkovich et al. | |
| 9,496,043 B1 | 11/2016 | Camp et al. | |
| 9,564,233 B1 | 2/2017 | Cho et al. | |
| 9,606,737 B2 | 3/2017 | Kankani et al. | |
| 9,645,177 B2 | 5/2017 | Cohen et al. | |
| 9,690,655 B2 | 6/2017 | Tabrizi et al. | |
| 9,710,180 B1 | 7/2017 | Van Gaasbeck | |
| 9,740,425 B2 | 8/2017 | Bakshi et al. | |
| 9,798,334 B1 | 10/2017 | Tabrizi et al. | |
| 9,842,060 B1 | 12/2017 | Jannyavula Venkata et al. | |
| 9,864,525 B2 | 1/2018 | Kankani et al. | |
| 9,891,844 B2 | 2/2018 | Kankani et al. | |
| 9,905,289 B1 | 2/2018 | Jeon et al. | |
| 2005/0172082 A1* | 8/2005 | Liu ..................... | G06F 12/0862 |
| | | | 711/144 |
| 2005/0223185 A1 | 10/2005 | Lee | |
| 2005/0278486 A1* | 12/2005 | Trika .................. | G06F 12/0804 |
| | | | 711/142 |
| 2007/0260811 A1 | 11/2007 | Merry, Jr. et al. | |
| 2007/0263444 A1 | 11/2007 | Gorobets et al. | |
| 2007/0266200 A1 | 11/2007 | Gorobets et al. | |
| 2008/0082725 A1 | 4/2008 | Elhamias | |
| 2008/0082726 A1 | 4/2008 | Elhamias | |
| 2009/0144598 A1 | 6/2009 | Yoon et al. | |
| 2010/0306577 A1 | 12/2010 | Dreifus et al. | |
| 2010/0306580 A1 | 12/2010 | McKean et al. | |
| 2010/0332923 A1 | 12/2010 | D'Abreu et al. | |
| 2011/0173484 A1 | 7/2011 | Schuette et al. | |
| 2011/0202818 A1 | 8/2011 | Yoon et al. | |
| 2012/0110239 A1 | 5/2012 | Goss et al. | |
| 2012/0192035 A1 | 7/2012 | Nakanishi | |
| 2012/0236656 A1 | 9/2012 | Cometti | |
| 2012/0239991 A1 | 9/2012 | Melik-Martirosian | |
| 2012/0268994 A1 | 10/2012 | Nagashima | |
| 2012/0290899 A1 | 11/2012 | Cideciyan et al. | |
| 2013/0019057 A1 | 1/2013 | Stephens | |
| 2013/0047044 A1 | 2/2013 | Weathers et al. | |
| 2013/0094286 A1 | 4/2013 | Sridharan et al. | |
| 2013/0151214 A1 | 6/2013 | Ryou | |
| 2013/0176784 A1 | 7/2013 | Cometti et al. | |
| 2013/0185487 A1 | 7/2013 | Kim et al. | |
| 2013/0227200 A1 | 8/2013 | Cometti et al. | |
| 2013/0311712 A1 | 11/2013 | Aso | |
| 2014/0006688 A1 | 1/2014 | Yu et al. | |
| 2014/0101499 A1 | 4/2014 | Griffin | |
| 2014/0181378 A1 | 6/2014 | Saeki et al. | |
| 2014/0181595 A1 | 6/2014 | Hoang et al. | |
| 2014/0195725 A1 | 7/2014 | Bennett | |
| 2014/0208174 A1 | 7/2014 | Ellis et al. | |
| 2014/0215129 A1 | 7/2014 | Kuzmin et al. | |
| 2014/0229799 A1 | 8/2014 | Hubris et al. | |
| 2014/0293699 A1 | 10/2014 | Yang et al. | |
| 2014/0347936 A1 | 11/2014 | Ghaly | |
| 2014/0359202 A1 | 12/2014 | Sun et al. | |
| 2014/0365836 A1 | 12/2014 | Jeon et al. | |
| 2015/0078094 A1 | 3/2015 | Nagashima | |
| 2015/0082121 A1 | 3/2015 | Wu et al. | |
| 2015/0227418 A1 | 8/2015 | Cai et al. | |
| 2015/0357045 A1 | 12/2015 | Moschiano et al. | |
| 2016/0004464 A1 | 1/2016 | Shen | |
| 2016/0092304 A1 | 3/2016 | Tabrizi et al. | |
| 2016/0093397 A1 | 3/2016 | Tabrizi et al. | |
| 2016/0148708 A1 | 5/2016 | Tuers et al. | |
| 2016/0306591 A1 | 10/2016 | Ellis et al. | |
| 2016/0342345 A1 | 11/2016 | Kankani et al. | |
| 2017/0090783 A1 | 3/2017 | Fukutomi et al. | |
| 2017/0109040 A1 | 4/2017 | Raghu et al. | |
| 2017/0228180 A1 | 8/2017 | Shen | |
| 2017/0235486 A1 | 8/2017 | Martineau et al. | |
| 2017/0262336 A1 | 9/2017 | Tabrizi et al. | |
| 2017/0315753 A1 | 11/2017 | Blount | |
| 2018/0018269 A1 | 1/2018 | Jannyavula Venkata et al. | |
| 2018/0032439 A1* | 2/2018 | Jenne .................. | G06F 12/0891 |
| 2018/0034476 A1 | 2/2018 | Kayser et al. | |
| 2018/0039795 A1 | 2/2018 | Gulati | |
| 2018/0060230 A1 | 3/2018 | Kankani et al. | |

FOREIGN PATENT DOCUMENTS

| | | |
|---|---|---|
| JP | 2011-100519 A | 5/2011 |
| JP | 2012-203957 A | 10/2012 |
| JP | 2013176784 A | 9/2013 |

OTHER PUBLICATIONS

Hyojin Choi et al.; "VLSI Implementation of BCH Error Correction for Multilevel Cell NAND Flash Memory"; IEEE Transactions on Very Large Scale Integration (VLSI) Systems; vol. 18, No. 5; pp. 843-847; May 2010 (5 pages).

Te-Hsuan Chen et al.; "An Adaptive-Rate Error Correction Scheme for NAND Flash Memory"; 27th IEEE VLSI Test Symposium; pp. 53-58; 2009 (6 pages).

Eran Gal et al.; "Algorithms and Data Structures for Flash Memories"; ACM Computing Surveys (CSUR); vol. 37, No. 2; pp. 138-163; Jun. 2005 (30 pages).

Mendel Rosenblum et al.; "The Design and Implementation of a Log-Structured File System"; ACM Transactions on Computer Systems; vol. 10; No. 1; pp. 26-52; Feb. 1992 (27 pages).

Chanik Park et al.; "A Reconfigurable FTL (Flash Translation Layer) Architecture for NAND Flash-Based Applications"; ACM Transactions on Embedded Computing Systems; vol. 7, No. 4, Article 38; Jul. 2008 (23 pages).

Yu Cai et al.; "Flash Correct-and-Refresh: Retention-Aware Error Management for Increased Flash Memory Lifetime"; Proceedings of the IEEE International Conference on Computer Design (ICCD); pp. 94-101; 2012 (10 pages).

Beomkyu Shin et al.; "Error Control Coding and Signal Processing for Flash Memories"; IEEE International Symposiu on Circuits and Systems (ISCAS); pp. 409-412; 2012 (4 pages).

Hlaleh Tabrizi et al.; "A Learning-based Network Selection Method in Heterogeneous Wireless Systems"; IEEE Global Telecommunications Conference (GLOBECOM 2011); 2011 (5 pages).

Neal Mielke et al.; "Recovery Effects in the Distributed Cycling of Flash Memories"; IEEE 44th Annual International Reliability Physics Symposium; pp. 29-35; 2006 (7 pages).

Ramesh Pyndiah et al.; "Near Optimum Decoding of Product Codes"; Global Telecommunicaitons Conference (GLOBECOM '94), Communications: The Global Bridge pp. 339-343; 1994 (5 pages).

Junsheng Han et al.; "Reliable Memories with Subline Accesses"; International Symposium on Information Theory (ISIT); pp. 2531-2535, Jun. 2007 (5 pages).

Ankit Singh Rawat et al.; "Locality and Availability in Distributed Storage," arXiv:1402.2011v1 [cs.IT]; Feb. 10, 2014 (9 pages).

Parikshit Gopalan et al.; "On the Locality of Codeword Symbols"; arXiv:1106.3625v1[cs.IT]; Jun. 18, 2011 (17 pages).

Frédérique Oggier et al.; "Self-repairing Homomorphic Codes for Distributed Storage Systems"; IEEE INFOCOM 2011; pp. 1215-1223; 2011 (9 pages).

Dimitris Papailiopoulos et al.; "Simple Regenerating Codes: Network Coding for Cloud Storage"; arXiv:1109.0264v1 [cs.IT]; Sep. 1, 2011 (9 pages).

Osama Khan et al.; "In Search of I/O-Optimal Recovery from Disk Failures"; HotStorage 2011; Jun. 2011 (5 pages).

(56) References Cited

OTHER PUBLICATIONS

Cheng Huang et al.; "Pyramid Codes: Flexible Schemes to Trade Space for Access Efficiency in Reliable Data Storage Systems"; Sixth IEEE International Symposium on Network Computing and Applications (NCA); 2007 (8 pages).

Hongchao Zhou et al.; "Error-Correcting Schemes with Dynamic Thresholds in Nonvolatile Memories"; 2011 IEEE International Symposium on Information Theory Proceedings; pp. 2143-2147; 2011; (5 pages).

Borja Peleato et al.; "Towards Minimizing Read Time for Nand Flash"; Globecom 2012—Symposium on Selected Areas in Communication; pp. 3219-3224; 2012 (6 pages).

Yongjune Kim et al.; "Modulation Coding for Flash Memories"; 2013 International Conference on Computing, Networking and Communications, Data Storage Technology and Applications Symposium; pp. 961-967; 2013 (7 pages).

Yu Cai et al.; "Program Interference in MLC NAND Flash Memory: Characterization, Modeling, and Mitigation"; 2013 IEEE International Conference on Computer Design (ICCD); pp. 123-130; 2013 (8 pages).

Yu Cai et al.; "Threshold Voltage Distribution in MLC NAND Flash Memory: Characterization, Analysis, and Modeling"; Proceedings of the Conference on Design, Automation and Test in Europe; pp. 1285-1290; 2013 (6 pages).

Eitan Yaakobi et al.; Error Characterization and Coding Schemes for Flash Memories; IEEE Globecom 2010 Workshop on Application of Communication Theory to Emerging Memory Technologies; pp. 1856-1860; 2010 (5 pages).

Borja Peleato et al.; "Maximizing MLC NAND lifetime and reliability in the presence of write noise"; IEEE International Conference on Communications (ICC); pp. 3752-3756; 2012 (5 pages).

\* cited by examiner

METHOD AND SYSTEM FOR DYNAMIC WRITE-BACK CACHE SIZING IN SOLID STATE MEMORY STORAGE

BACKGROUND

Solid state memory storage devices may be used to store data. Such solid state storage devices may be based on solid state memory such as, for example, Flash Memory, Phase Change Memory (PCM) and Spin Torque Magnetic Random Access memory. To enhance write performance, a write-back cache may buffer data to be written to the solid state memory.

DETAILED DESCRIPTION

Figure 1A:
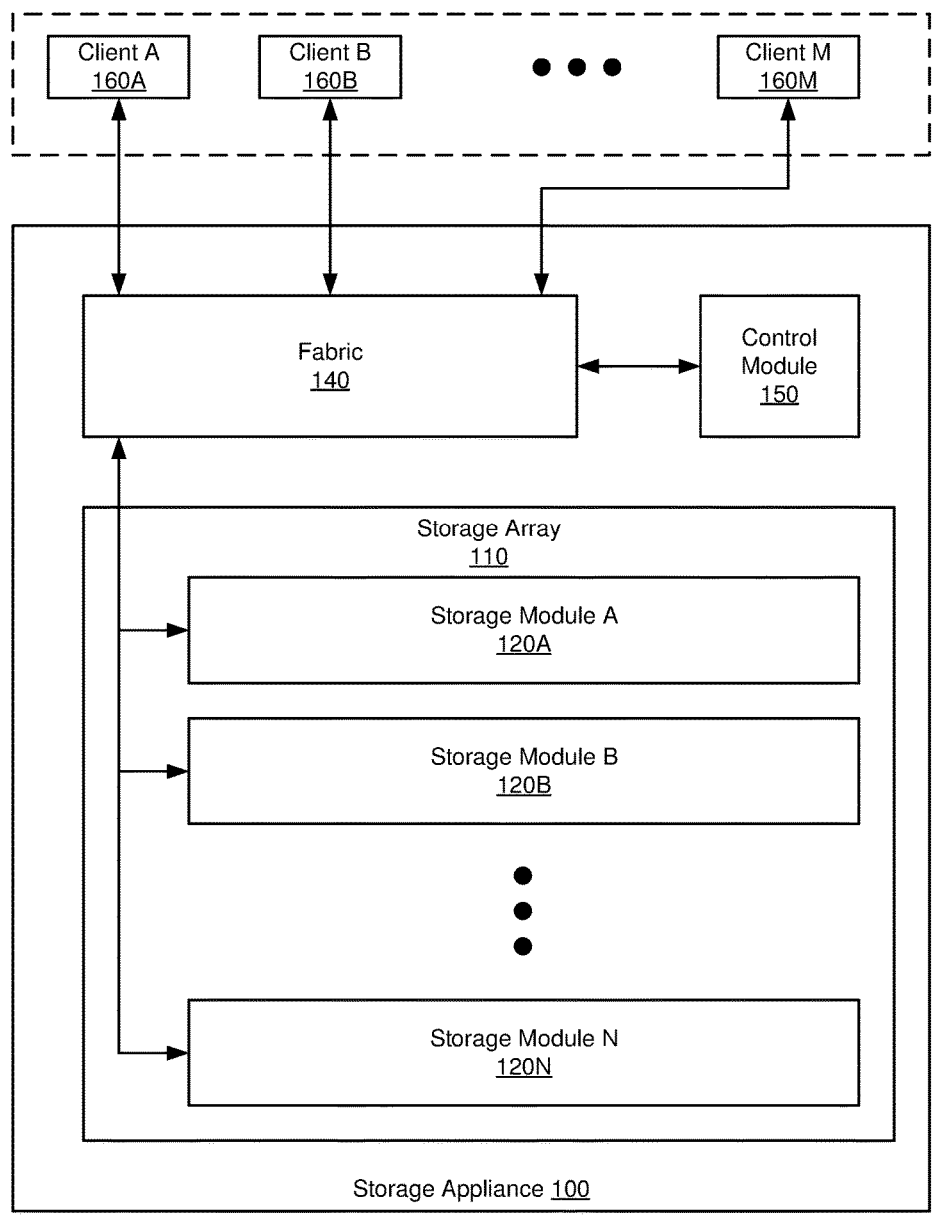
FIGS. 1A and 1B show systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-4, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to the implementation of a write-back cache in solid state memory storage systems. A write-back cache may enhance write performance by buffering data to be written to a storage medium, e.g., solid state memory, until the data can be written. The write-back cache may thus serve as a temporary storage where the data to be written may be kept while the solid state memory storage system is serving other write requests and/or other operations.

If no protective measures are in place, a power loss may result in loss and/or corruption of data, because the content of the write-back cache cannot be written to the storage medium, even though the write operations were already acknowledged when the data were received by the write-back cache. Such power losses may occur, for example, due to an electrical problem, but also if a solid state storage module is spontaneously removed from a modular solid state storage chassis. The removal of solid state storage modules from the chassis may be a common operation in hot-pluggable storage solutions.

In one or more embodiments of the technology, a backup power source ensures that electric power is provided until all data, held by the write-back cache, has been written to the storage medium. Accordingly, the backup power source is sized to power a storage module for an amount of time necessary to write all data in the write-back cache to the storage medium. This amount of time may depend on various factors. More specifically, the amount of time depends on the size of the write-back cache, and the rate at which the necessary write operations to the storage medium can be performed. Further, the rate at which the necessary write operations to the medium can be performed, in accordance with one or more embodiments of the technology, is variable. If the data that remains in the write-back cache are directed to memory locations whose writing require different resources that can be simultaneously accessed, these write operations may, to at least some extent, be performed in parallel and may thus be rapidly completed. In contrast, if the data are directed to memory locations whose writing require the same resources, the write operations may only be sequentially performed, thus requiring more time. Generally, the aggregate throughput for write operations to a storage medium is higher than a worst case because typical writes target memory locations whose writing require different resources that may be accessed in parallel, whereas in the worst case, the use of resources is concentrated to a few resources that become a bottleneck.

In one or more embodiments of the technology, the write-back cache is, therefore, dynamically sized, to ensure that all data can be written to the storage medium before the backup power source fails. The write-back cache, in accordance with one or more embodiments of the technology, only accepts new data fragments to be written to the storage medium if it can be guaranteed that, within the time available before the backup power source fails, all data fragments in the write-back cache can be written to the storage medium, based on the mix of writes operations to be performed. This may result in a smaller available cache if many write operations require the same resources, thereby causing performance bottlenecks, or it may result in a larger available write-back cache if the writing of the data fragments remaining in the cache requires a mix of resources, thus allowing write operations to be performed in parallel. The bandwidth availability of the targeted resources, in accordance with an embodiment of the technology, is explicitly considered to properly size the available write-back cache.

Figure 1B:
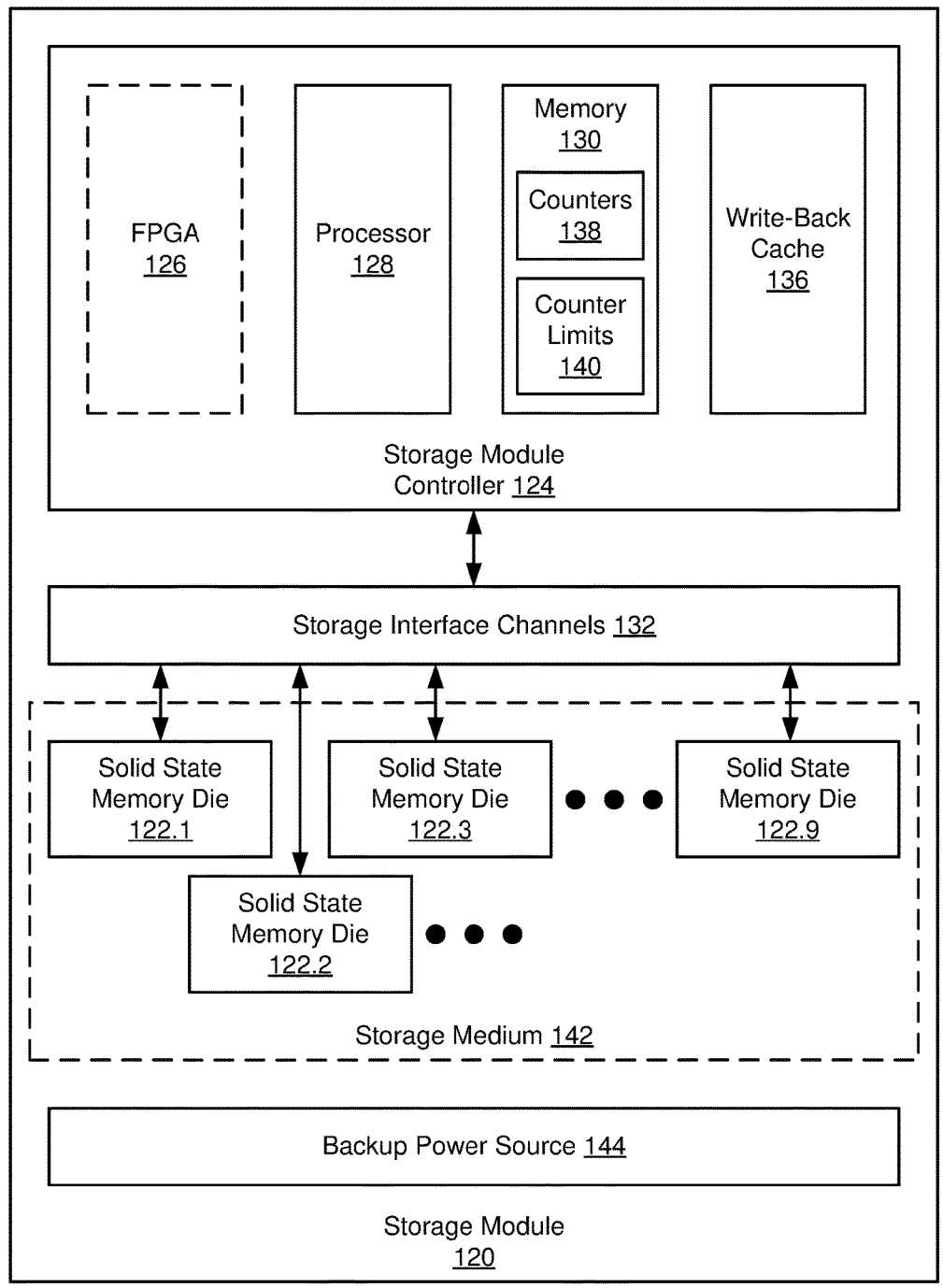

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system, a block device driver, an application programming interface (API) to enable the client to access the storage appliance, and/or a user programming library. The file system, the block device driver and/or the user programming library provide mechanisms for the storage and retrieval of files from the storage appliance (100). More specifically, the file system, the block device driver and/or the user programming library include functionality to perform the necessary actions to issue read requests and write requests to the storage appliance. They may also provide programming interfaces to enable the creation and deletion of files, reading and writing of files, performing seeks within a file, creating and deleting directories, managing directory contents, etc. In addition, they may also provide management interfaces to create and delete file systems. In one embodiment of the technology, to access a file, the operating system (via the file system, the block device driver and/or the user programming library) typically provides file manipulation interfaces to open, close, read, and write the data within each file and/or to manipulate the corresponding metadata.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating memory regions in the solid state memory modules (120A-120N) and directing read and write requests, issued, e.g., by a client (160A-160M) to the appropriate storage module (120A-120N).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

FIG. 1B shows a storage module, in accordance with one or more embodiments of the technology. The storage module (120) includes a storage medium (142) to persistently store data. Generally, the storage medium (142) may include any type of non-volatile memory. In one embodiment of the technology, the storage medium (142) includes solid state memory dies (122). In the exemplary storage module (120), shown in FIG. 2, the storage medium (142) includes nine solid state memory dies (122.1-122.9). Each of these solid state memory dies may include a solid state storage circuit of any capacity. A solid state memory die may include, but is not limited to, Flash Memory, Spin Torque Magnetic Random Access Memory (ST-RAM) and Phase Change Memory (PCM). A set of solid state memory dies may operate in conjunction to form the storage medium (142). For example, eight solid state memory dies may be used for data storage and a ninth solid state memory die may be used for storage of error-correcting code (ECC). Each of the solid state memory dies may be equipped with a storage interface channel (132).

In one embodiment of the technology, the storage interface channels (132) establish interfaces between the storage module controller (124) and the solid state memory dies (122) of the storage medium (142). The storage interface channels (132) may be electrical bus interfaces of any type, as needed to support data transfers between the storage module controller and the solid state memory dies (122) of the solid state storage medium (142). A single storage interface channel may establish a one-to-one connection between the storage module controller and a particular solid state memory die, or it may establish a one-to-many switched or non-switched connection between the storage module controller and multiple solid state memory dies. One-to-many configurations may rely, for example, on the address of the memory location to be written to, in order to identify the solid state memory die on which the write operation is to be performed.

In one embodiment of the technology, any component of the storage module (120) that is involved in the writing of a data fragment to the storage medium (142) is considered a resource. For example, a solid state memory die to which the data fragment is written, is considered a resource. Further, a storage interface channel connecting to the solid state memory die to which the data fragment is to be written is considered a resource. Other resources may include a partition or block of the memory die, e.g., a particular segment of the solid state memory die to which the data fragment is to be written, or any other independently addressable unit of the solid state memory die. Accordingly, write operations, depending on the targeted memory location, may require different resources. Consider, for example, a first write operation to a memory location in solid state memory die 1 (122.1). In this scenario, the required resources include at least solid state memory die 1 (122.1) and the storage interface channel (132) that connects the storage module controller (124) to solid state memory die 1 (122.1). In this scenario, solid state memory dies (122.2-122.9) and their storage interface channels are not considered resources because they are not required for the write operation to solid state memory die 1 (122.1). Accordingly, resources, in accordance with one or more embodiments of the technology, are write-operation-specific, i.e., to determine the resources required for the completion of a write operation, the memory location targeted by the write operations needs to be known.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory storage medium (142). These requests may originate from the clients (160A-160M) or from the control module (150), and may be conveyed to the storage module controller (124) via the fabric (140). The servicing of read and/or write requests may include resolving the resources required to perform the read/write operation. For example, the storage module controller (124) may determine, based on a received write address, the memory location in the storage medium (142), where data is to be stored, e.g., on a particular solid state memory die (122) at a particular physical address. Further, the storage module controller (124) may perform or may support administrative tasks including the methods described in FIGS. 2-4.

Figure 2:
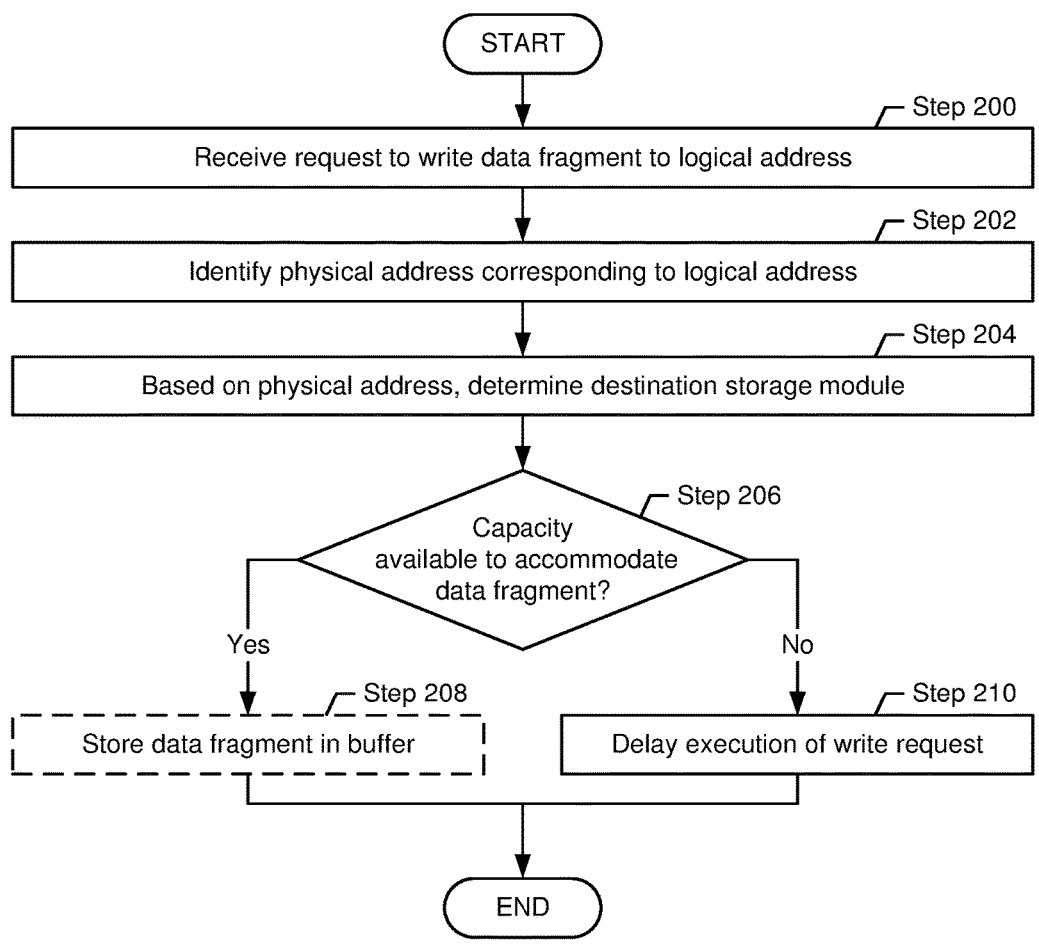
FIGS. 2-4 show flowcharts, in accordance with one or more embodiments of the technology.
Figure 3:
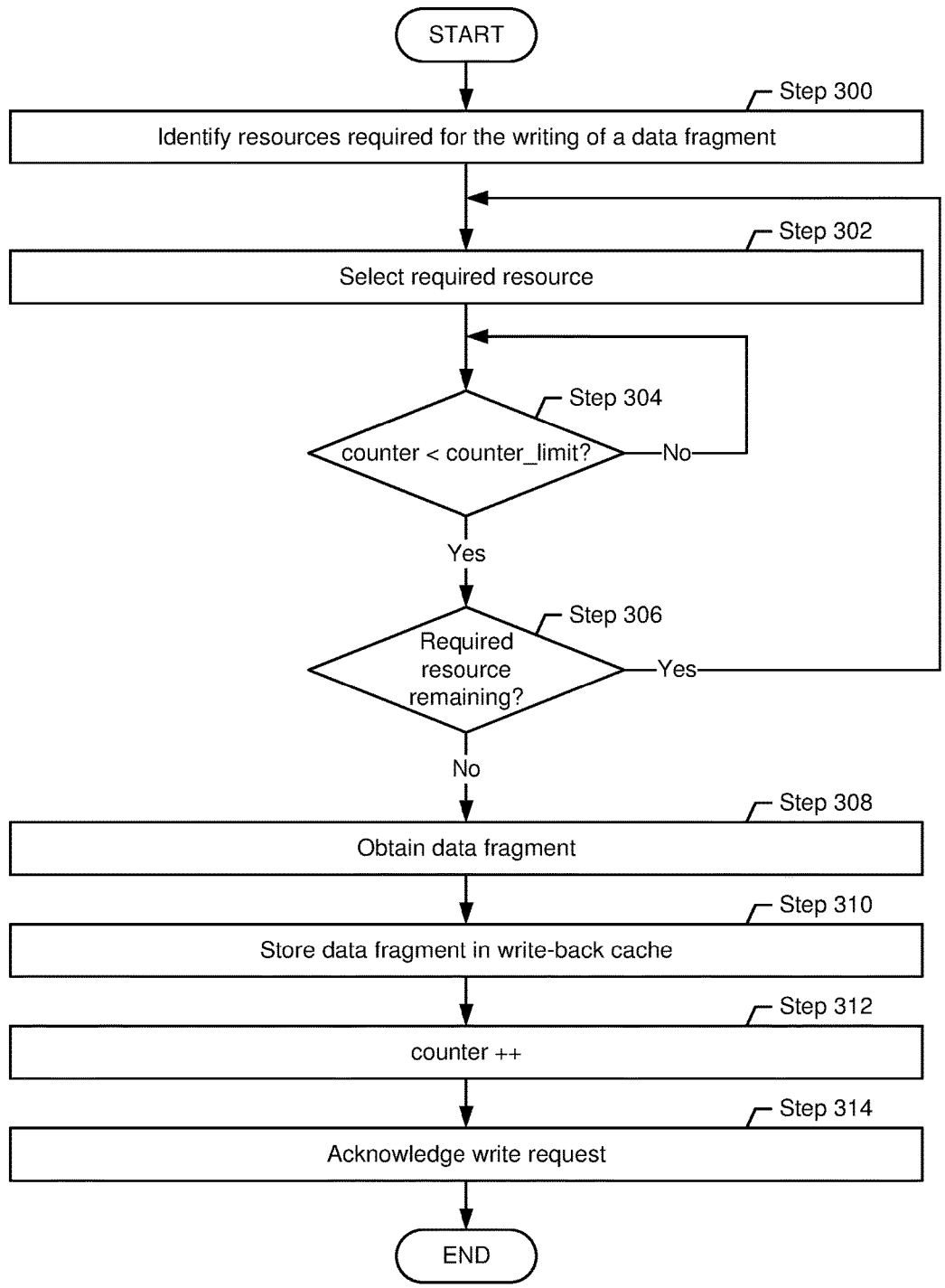
Figure 4:
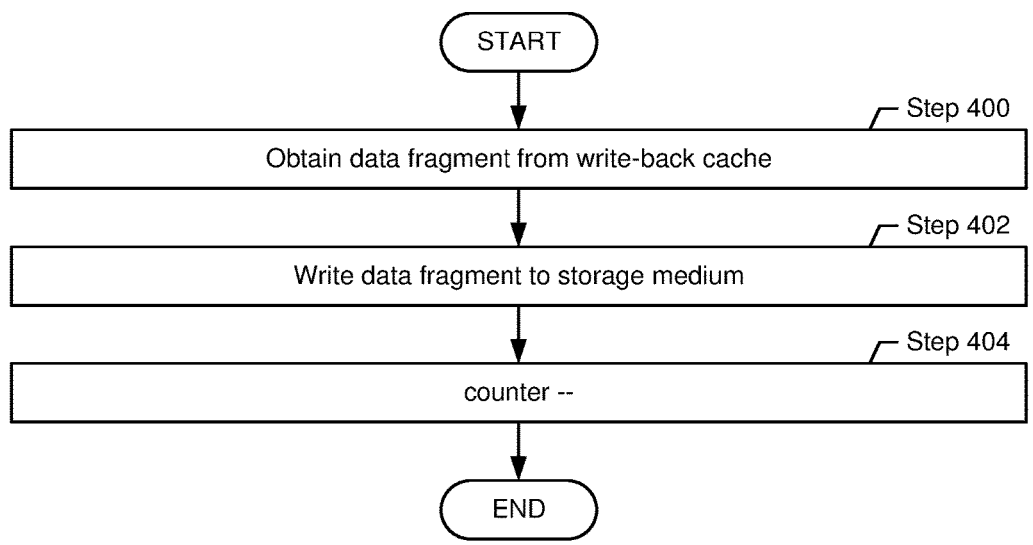

In one embodiment of the technology, the storage module controller (124) includes a processor (128) (e.g., one or more cores, or micro-cores of a processor that are configured to execute instructions) and memory (130) (e.g., volatile memory that may be, but is not limited to, dynamic random-access memory (DRAM), synchronous DRAM, SDR SDRAM, and DDR SDRAM) to perform at least one of the steps described in FIGS. 2-4. Alternatively or additionally, the storage module controller (124) may include a field-programmable gate array (FPGA) and/or an application-specific integrated circuit (ASIC) (126).

In one or more embodiments of the technology, the memory (130) accommodates one or more counters (138). The counter(s) may be manipulated by the processor (128) and/or by the FPGA (126), as described in FIGS. 2-4. The counters may be stored using any numerical format supported by the storage module controller (124), including, for example, signed or unsigned integer format, floating point format, etc.

In one or more embodiments of the technology, the memory (130) further accommodates one or more counter limits (140). For each counter (138), there may be a counter limit (140). The counter limits may be fixed limits, configured to limit the number of data fragments in the write-back cache such that all data fragments in the write-back cache can be written to the storage medium (142) prior to failure of the backup power source (144).

In one or more embodiments of the technology, counters and counter limits are resource-specific. For example, a single counter limit may be set for a particular solid state memory die. Assume, for example, that an exemplary solid state memory die can perform 10,000 write operations in 100 ms. Further assume that the backup power source (144) is capable of powering the storage module (100) for one second. The counter limit may thus be set to 100,000, thus allowing the buffering of 100,000 data fragments to be written to the solid state memory die. These writes can all be completed prior to a power loss. The corresponding counter is monitored to prevent the acceptance of additional data fragments in the write-back cache, once the limit, set by the counter limit, is reached. Different counter limits may be used for different resources. Consider, for example, the use of additional counters for individual partitions on the previously discussed memory die. Although the memory die is capable of performing 10,000 write operations within 100 ms, assume that a partition of the memory die can only handle 100 write operations. Accordingly, it may be important to dedicate a counter to the partition, because if many write requests are directed to a single or a few partitions, the partition may be the resource that causes a bottleneck even though the aggregate bandwidth of the entire solid state memory would be sufficient. In the example, a counter limit of 1,000 may thus be used to limit the data fragments in the write-back cache, that are directed to the partition. Those skilled in the art will appreciate that counter limits may be set for any resource that may become a bottleneck when write operations are performed. Further, counters and corresponding counter limits may in addition or alternatively be implemented for groups of resources. For example, assume that a write operation always involves writes to all solid memory dies (122.1-122.9). In this scenario, a single counter and a single counter limit is sufficient to track write activity to the solid state memory dies. However, even though the storage interface channels (132) are used to transfer the data fragments to be written to the solid state memory dies, the same counter may not be used to track activity on the storage interface channels, because the storage interface channels may also serve other solid state memory dies. A separate counter may thus still be necessary to track the activity of the storage interface channels.

In one or more embodiments of the technology, the storage module controller (124) includes the previously introduced write-back cache (136). The write-back cache may be any type of memory, e.g., synchronous dynamic random-access memory (SDRAM), suitable for buffering data to be written to the storage medium (142). In one embodiment of the technology, the write-back cache is volatile memory and therefore needs to be continuously powered in order to maintain the stored data. While the write-back cache (136), in accordance with an embodiment of the technology, is of a fixed size, e.g., multiple megabytes (MB), the actually allowed amount of data that may be held by the write-back cache is dynamically controlled by the counter(s) (138), as further described with reference to FIGS. 2-4. Accordingly, the full amount of write-back cache (136) may not be available for data buffering.

In one or more embodiments of the technology, the storage module includes a backup power source. The backup power source (140) is configured to provide electric power to components of the storage module (120) until the content of the write-back cache has been completely written to the storage medium (142). The backup power source may be any type of electric power source, including, but not limited to a battery, a capacitor and a super-capacitor.

One skilled in the art will recognize that the architecture of the system is not limited to the components shown in FIGS. 1A and 1B. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology. A storage module (120) may further include any number of solid state memory dies and any number of storage media, without departing from the technology. Also, various components, e.g., the clients (160) the control module (150) and the storage modules (120) may include buffers, i.e., volatile storage, e.g., any kind of random access memory (RAM), that may be used to temporarily store data to be transferred to or from a storage medium, if the transfer cannot be immediately performed. Such a buffer may operate as a first-in-first-out (FIFO) type buffer.

Further those skilled in the art will appreciate that in the storage module (120) any component may be considered a resource, if it is relied upon for the completion of a write operation. As previously noted, combinations of counters and counter limits may be used to track activity of resources and to limit the number of data fragments targeting a particular resource or set of resources. Counters and counter limits may be assigned to any resource or to any combination of resources, without departing from the technology.

FIGS. 2-4 show flowcharts describing methods for using a dynamically sized write back cache in a solid state memory storage system, in accordance with one or more embodiments of the technology. FIG. 2 shows a method for processing a data fragment when received by the storage appliance, FIG. 3 shows a method for storing an obtained data fragment in the write-back cache, and FIG. 4 shows a method for writing a data fragment, stored in the write-back cache to the storage medium.

FIG. 2 shows a method processing a data fragment, received by the storage appliance. The data fragment to be processed is a data fragment that is to be written to one of the storage modules of the storage appliance. Accordingly, the method described in FIG. 2 may be executed whenever a data fragment is received, e.g., from a client.

Turning to FIG. 2, in Step 200, a request to write a data fragment to a logical address is received by the storage appliance. The write request may use a logical address to indicate the memory location to be addressed. The write request may have been received from a client attempting to write to the solid state memory of the storage appliance. The request may be received by the storage appliance and may reach the storage module controller of the storage module to which the client is attempting to write. The request, in accordance with an embodiment of the technology, includes a data fragment to be written and a logical address to be written to.

In Step 202, the physical address corresponding to the logical address is identified. This address translation may enable the storage appliance to identify the memory location where the data fragment is to be stored. The address translation may be performed by the storage module controller, e.g., by an FPGA of the storage module controller that may be specialized in rapidly performing logical to physical address translations during write or read operations. The address translation may be based on the mapping established by the map variables in the memory region record.

In Step 204, the destination storage module in which the data fragment is to be stored is identified, based on the physical address obtained in Step 202.

In Step 206, a determination is made about whether capacity is available to accommodate the data fragment. In other words, it is determined whether the data fragment can be forwarded directly to the destination storage module, or whether it can be buffered prior to forwarding it to the destination storage module. If free capacity is available, the method may proceed to Step 208, where the data fragment is either stored in a buffer or directly forwarded to the destination storage module. If no free capacity is available, the method may proceed to Step 210.

In Step 210, the execution of the write request is delayed until it can be accommodated. Alternatively, the write request may be denied. If the write request is denied, the client that provided the write request may be notified that the write request was denied.

Alternatively, Steps 206-210 may be skipped, and the data fragment may be directly processed as described in FIG. 3.

FIG. 3 shows a method for storing a data fragment in the write-back cache, in accordance with one or more embodiments of the technology. The data fragment may be a data fragment received from a client that issued a write request, or a data fragment that is currently stored in the fabric buffer of the storage appliance.

Turning to FIG. 3, in Step 300, the resources required for writing the data fragment are determined. The required resources are determined based on the physical destination address of the data fragment. Any resource that is being relied upon during the process of writing the data fragment to its physical destination address is considered a resource.

In Step 302, one resource of the identified required resources is selected. Resources may be selected in any order, without departing from the technology.

In Step 304, a determination is made about whether the counter, specific to the selected resource is less than the counter_limit for the selected resource. The determination is made to determine whether the additional data fragment, if stored in the write-back cache, can be written to the storage medium in a timely manner, in case of a power failure. If a determination is made that the counter has reached the counter_limit, the method may remain in Step 304, i.e., the method may not proceed with storing the data fragment in the write-back cache, until the counter has been decremented, e.g., after another data packet, currently stored in the write-back cache, and that required the resource, has been written to the storage medium, thus freeing up bandwidth for the newly received data package. If a determination is made that the counter is less than the counter_limit, the method may proceed to Step 306.

In Step 306, a determination is made about whether additional required resources are remaining, i.e., resources that are also required for the writing of the data fragment to the storage medium. If such required resources are remaining, the method may return to Step 302, to repeat Steps 302 and 304 for this required resource. If no required resources are remaining, the method may proceed to Step 308.

Steps 302-306, in combination, ensure that no data fragment is stored in the write-back cache unless all resources required for the writing of the data fragment to the storage medium have sufficient bandwidth to guarantee that the write can be completed within the time during which the memory module can be powered by the backup power source. The storing of a data fragment in the write-back cache may thus be delayed until the required resources have sufficient bandwidth.

In Step 308, the data fragment is obtained from the buffer or directly from the client, via the fabric, and in Step 310, the date fragment is stored in the write-back cache.

In Step 312, the counter (s) are incremented. Specifically, any counter that is associated with the required resource(s) identified in Step 300 is incremented.

In Step 314, the storage module acknowledges the write request. Accordingly, the storage appliance considers the write as completed, even though the data fragment to be written currently resides in the write-back cache and has not yet been written to the storage medium.

FIG. 4 shows a method for writing a data fragment, stored in the write-back cache, to the storage medium. The method may be executed for each data fragment stored in the write-back cache, until no data fragment remains in the write-back cache. While the previously described FIGS. 2 and 3 describe methods that result in data fragments being stored in the write-back cache, FIG. 4 describes a method that result in the removal of data fragments from the write-back cache (by writing the data fragments to the memory locations in the storage medium, as identified by the data fragments' physical destination addresses). Accordingly, at least some of the steps described in FIG. 4 may be performed while electric power is provided by the backup power source, after failure of the primary power source, whereas the methods of FIGS. 2 and 3 may only be executed when power is provided by the primary power source.

Turning to FIG. 4, in Step 400, the data fragment to be written to the storage medium is retrieved from the write-back cache. In Step 402, the data fragment is written to the storage medium, at the memory location specified by the data fragment's physical destination address. In Step 404, the counter(s) associated with the resource(s) being used for the write operation, as previously identified in Step 300, are decremented.

Embodiments of the technology enable solid state storage systems in which spontaneous power failures do not result in the loss of data that are buffered in a write-back cache of a storage module. In a system in accordance with one or more embodiments of the technology, the allowable data in the write-back cache is limited such that, within the time during which a backup power source powers the storage module, the data in the write-back cache can be written to the storage medium. The limitation on the write-back cache is dynamically controlled such that a maximum volume of data, for which the writing to the storage medium can be guaranteed, can always be held by the write-back cache. Embodiments of the technology thus provide performance advantages over solutions where the write-back cache is limited to a small, constant size. Embodiment of the technology may be employed in particular in storage systems that support hot-pluggable storage modules that may be spontaneously removed during operation. In such a system, all data in the write-back cache may be written to the storage medium, without a loss of data, in accordance with one or more embodiment of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for dynamic write-back cache sizing in solid state memory storage, the method comprising:
    receiving a first request to write a first data fragment to a first memory location in solid state memory of a storage medium, wherein the first memory location is identified by a first write address of the solid state memory;
    identifying, based on the first write address, a first resource required for writing the first data fragment to the first memory location;
    obtaining a state of the first resource,
        wherein the state of the first resource is governed by a number of data fragments that are currently stored in the write-back cache which require the first resource, and
        wherein the number of data fragments that are currently stored in the write-back cache which require the first resource are limited to a number that enables a writing of all data fragments in the write-back cache to the storage medium, within a specified amount of time;
    making a first determination that the state of the first resource allows the received first data fragment to be stored in the write-back cache, and based on the first determination:
        storing the first data fragment in the write-back cache;
        updating the state of the state of the first resource; and
        acknowledging the first write request.

2. The method of claim 1, further comprising:
    writing the first data fragment, stored in the write-back cache, to the storage medium, using the first resource; and
    updating the state of the first resource.

3. The method of claim 1, further comprising:
    receiving a second request to write a second data fragment to a second memory location on the storage medium, wherein the second memory location is identified by a second write address of the solid state memory;
    identifying, based on the second write address, a second resource, required for writing the second data fragment to the second memory location;
    obtaining a state of the second resource;
    making a second determination that the state of the second resource does not allow the received data fragment to be stored in the write-back cache, and based on the second determination:
        performing one selected from a group consisting of:
            denying the storage of the second data fragment in the write-back cache and not acknowledging the second write request; and
            delaying the storage of the second data fragment in the write-back cache and delaying acknowledging the second write request.

4. The method of claim 3, wherein, after the second write request is not acknowledged, the second data fragment is stored in a buffer of the solid state memory storage.

5. The method of claim 1, further comprising:
    receiving a second request to write a second data fragment to a second memory location on the storage medium, wherein the second memory location is identified by a second write address of the solid state memory;
    identifying the first and a second resource, required for writing the second data fragment to the second memory location, based on the second write address;
    obtaining the state of the first resource;

making a second determination that the state of the first
   resource allows the received second data fragment to be
   stored in the write-back cache;
obtaining a state of the second resource;
making a third determination that the state of the second
   resource does not allow the second data fragment to be
   stored in the write-back cache; and
based on the second and the third determinations:
   performing one selected from a group consisting of:
      denying the storage of the second data fragment in
         the write-back cache and not acknowledging the
         second write request; and
      delaying the storage of the second data fragment in
         the write-back cache and delaying acknowledging
         the second write request.

6. The method of claim 1,
wherein the state of the first resource is tracked using a
   counter;
wherein the counter is incremented when a data fragment
   whose writing to the storage medium requires the first
   resource is received by the write-back cache; and
wherein the counter is decremented when a data fragment,
   stored in the write-back cache, is written to the medium
   using the first resource.

7. The method of claim 1,
wherein the specified amount of time is governed by a
   time interval during which a backup power source
   powers the solid state memory storage after a loss of a
   main power source.

8. A storage appliance comprising:
a storage module comprising a storage module controller
   and a storage medium wherein the storage module
   controller is configured to:
   receive a first request to write a first data fragment to a
      first memory location in solid state memory of the
      storage medium, wherein the first memory location
      is identified by a first write address of the solid state
      memory;
   identify, based on the first write address, a first resource
      required for writing the first data fragment to the first
      memory location;
   obtain a state of the first resource,
      wherein the state of the first resource is governed by
         a number of data fragments that are currently
         stored in the write-back cache which require the
         first resource, and
      wherein the number of data fragments that are cur-
         rently stored in the write-back cache which require
         the first resource are limited to a number that
         enables a writing of all data fragments in the
         write-back cache to the storage medium, within a
         specified amount of time;
   make a first determination that the state of the first
      resource allows the received first data fragment to be
      stored in the write-back cache, and based on the first
      determination:
      store the first data fragment in the write-back cache;
      update the state of the state of the first resource; and
      acknowledge the first write request.

9. The storage appliance of claim 8, wherein the storage
module controller is further configured to:
   write the first data fragment, stored in the write-back
      cache, to the storage medium, using the first resource;
      and
   update the state of the first resource.

10. The storage appliance of claim 8, wherein the storage
module controller is further configured to:
   receive a second request to write a second data fragment
      to a second memory location on the storage medium,
      wherein the second memory location is identified by a
      second write address of the solid state memory;
   identify, based on the second write address, a second
      resource, required for writing the second data fragment
      to the second memory location;
   obtain a state of the second resource;
   make a second determination that the state of the second
      resource does not allow the received data fragment to
      be stored in the write-back cache, and based on the
      second determination:
      perform one selected from the group consisting of:
         denying the storage of the second data fragment in
            the write-back cache and not acknowledging the
            second write request; and
         delaying the storage of the second data fragment in
            the write-back cache and delaying acknowledging
            the second write request.

11. The storage appliance of claim 10, wherein, after the
second write request is not acknowledged, the second data
fragment is stored in a buffer of the storage appliance.

12. The storage appliance of claim 8, wherein the storage
module controller is further configured to:
   receive a second request to write a second data fragment
      to a second memory location on the storage medium,
      wherein the second memory location is identified by a
      second write address of the solid state memory;
   identify the first and a second resource, required for
      writing the second data fragment to the second memory
      location, based on the second write address;
   obtain the state of the first resource;
   make a second determination that the state of the first
      resource allows the received second data fragment to be
      stored in the write-back cache;
   obtain a state of the second resource;
   make a third determination that the state of the second
      resource does not allow the second data fragment to be
      stored in the write-back cache; and
   based on the second and the third determinations:
      perform one selected from a group consisting of:
         denying the storage of the second data fragment in
            the write-back cache and not acknowledging the
            second write request; and
         delaying the storage of the second data fragment in
            the write-back cache and delaying acknowledging
            the second write request.

13. The storage appliance of claim 8,
wherein the state of the first resource is tracked using a
   counter;
wherein the counter is incremented when a data fragment
   whose writing to the storage medium requires the first
   resource is received by the write-back cache; and
wherein the counter is decremented when a data fragment,
   stored in the write-back cache, is written to the medium
   using the first resource.

14. The storage appliance of claim 8,
wherein the specified amount of time is governed by a
   time interval during which a backup power source
   powers the storage module after a loss of a main power
   source.

15. A non-transitory computer readable medium (CRM)
comprising instructions that enable a storage appliance to:
   receive a first request to write a first data fragment to a
      first memory location in solid state memory of a storage
      medium, wherein the first memory location is identified
      by a first write address of the solid state memory;

identify, based on the first write address, a first resource required for writing the first data fragment to the first memory location;

obtain a state of the first resource,
wherein the state of the first resource is governed by a number of data fragments that are currently stored in the write-back cache which require the first resource, and
wherein the number of data fragments that are currently stored in the write-back cache which require the first resource are limited to a number that enables a writing of all data fragments in the write-back cache to the storage medium, within a specified amount of time;

make a first determination that the state of the first resource allows the received first data fragment to be stored in the write-back cache, and based on the first determination:
store the first data fragment in the write-back cache;
update the state of the state of the first resource; and
acknowledge the first write request.

16. The non-transitory CRM of claim 15 further comprising instructions that enable the storage appliance to:
write the first data fragment, stored in the write-back cache, to the storage medium, using the first resource; and
update the state of the first resource.

17. The non-transitory CRM of claim 15 further comprising instructions that enable the storage appliance to:
receive a second request to write a second data fragment to a second memory location on the storage medium, wherein the second memory location is identified by a second write address of the solid state memory;
identify, based on the second write address, a second resource, required for writing the second data fragment to the second memory location;
obtain a state of the second resource;
make a second determination that the state of the second resource does not allow the received data fragment to be stored in the write-back cache, and based on the second determination:
performing one selected from a group consisting of:
denying the storage of the second data fragment in the write-back cache and not acknowledging the second write request; and
delaying the storage of the second data fragment in the write-back cache and delaying acknowledging the second write request.

18. The non-transitory CRM of claim 17 wherein, after the second write request is not acknowledged, the second data fragment is stored in a buffer of the solid state memory storage.

19. The non-transitory CRM of claim 15 further comprising instructions that enable the storage appliance to:
receive a second request to write a second data fragment to a second memory location on the storage medium, wherein the second memory location is identified by a second write address of the solid state memory;
identify the first and a second resource, required for writing the second data fragment to the second memory location, based on the second write address;
obtain the state of the first resource;
make a second determination that the state of the first resource allows the received second data fragment to be stored in the write-back cache;
obtain a state of the second resource;
make a third determination that the state of the second resource does not allow the second data fragment to be stored in the write-back cache; and
based on the second and the third determinations:
performing one selected from a group consisting of:
denying the storage of the second data fragment in the write-back cache and not acknowledging the second write request; and
delaying the storage of the second data fragment in the write-back cache and delaying acknowledging the second write request.

20. The non-transitory CRM of claim 15,
wherein the state of the first resource is tracked using a counter;
wherein the counter is incremented when a data fragment whose writing to the storage medium requires the first resource is received by the write-back cache; and
wherein the counter is decremented when a data fragment, stored in the write-back cache, is written to the medium using the first resource.

* * * * *